Oct. 19, 1965    R. T. PENNINGTON    3,212,986
THREE TANK SEPARATE SUPERHEAT REACTOR
Filed Nov. 5, 1964

INVENTOR.
ROBERT T. PENNINGTON
BY
ATTORNEY 3,212,986
THREE TANK SEPARATE SUPERHEAT REACTOR
Robert T. Pennington, San Jose, Calif., assignor, by mesne assignments, to the United States of America as represented by the United States Atomic Energy Commission
Filed Nov. 5, 1964, Ser. No. 409,335
8 Claims. (Cl. 176—59)

This invention relates to nuclear reactors and in particular to nuclear reactors used for superheating steam having simplified constructions and control systems.

The typical configurations of presently developed superheat reactors are generally complex, requiring sundry processing plenums, and a myriad of ducts, manifolds and other devices for directing incoming steam through process tubes of one type or another. Prompt control of the reactivity level of the reactor is generally by means of control rods or mechanically movable reflector portions; and various scram safety arrangements are employed to safeguard against excessive reactivity excursions. With such arrangements further complicating structure is usually required and inherent safety characteristics leave something to be desired.

Refueling of currently developed reactors generally requires disconnecting numerous pipes and manifold flanges to gain access to the core region, in addition, heavy duty hoists are usually required to remove the biological shielding material covering the reactor. With designs employed heretofore it is difficult to achieve a low water to fuel ratio so as to permit selection of optimum moderator to fuel ratio and to minimize hazardous changes in reactivity due to flooding or voiding of moderator from steam spaces and to changes in moderator density. The present invention dispenses with much of the ducting and other complexities by disposing moderator instead of the steam coolant in process tubes and by directing the incoming low quality steam through a jacket around the core and then up through the fuel region around the outside of the fissile material containing superheat fuel rods. With the present invention, reactivity is controlled by varying the amount of moderating material within the core. This controlled variation in moderator-to-fuel ratio results in improved inherent operating safety characteristics of the reactor by permitting increased leakage of fast neutrons during a reactivity surge. Additional and especially effective control is achieved by use of control rods in which control rod worth is enhanced by the disposition of control rods of selected shapes arranged within the moderator process tubes to displace a portion of the moderating material as the control rod is inserted into the core as well as to more effectively utilize neutrons moderated therein for control purposes.

A further improvement over current superheat reactors is achieved in the present invention through the utilization of a liquid moderating material flowing through moderator containment tubes so that the liquid does not come in contact with the fuel elements. Any liquid entering the fuel region through flooding or leakage is arranged to be immediately drained out of the reactor. The arrangement of the present invention eliminates the requirement for disconnecting any piping and use of heavy duty hoists. Access to the core for refueling the reactor is achieved merely by first pumping or otherwise removing the liquid biological shield material from the tank shaped cover and then, using relatively light duty hoists, or other means, lifting the cover from the reactor vessel.

It is therefore an object of this invention to provide a nuclear reactor for superheating steam.

It is a further object of this invention to provide a superheat nuclear reactor wherein variation of the moderator-to-fuel ratio is used to control reactivity.

It is also an object of this invention to provide a superheat nuclear reactor having an improved refueling arrangement.

It is a further object of this invention to provide a superheat nuclear reactor having improved inherent safety characteristics.

A further object of this invention is to provide a superheat nuclear reactor having a control system configuration wherein the control rod worth is improved.

It is a further object of this invention to provide a superheat nuclear reactor utilizing a liquid moderator contained separately from the fuel element system.

There are other objects and advantages that will be apparent to one skilled in the art from the following description taken with the accompanying drawings, in which.

Figure 1:
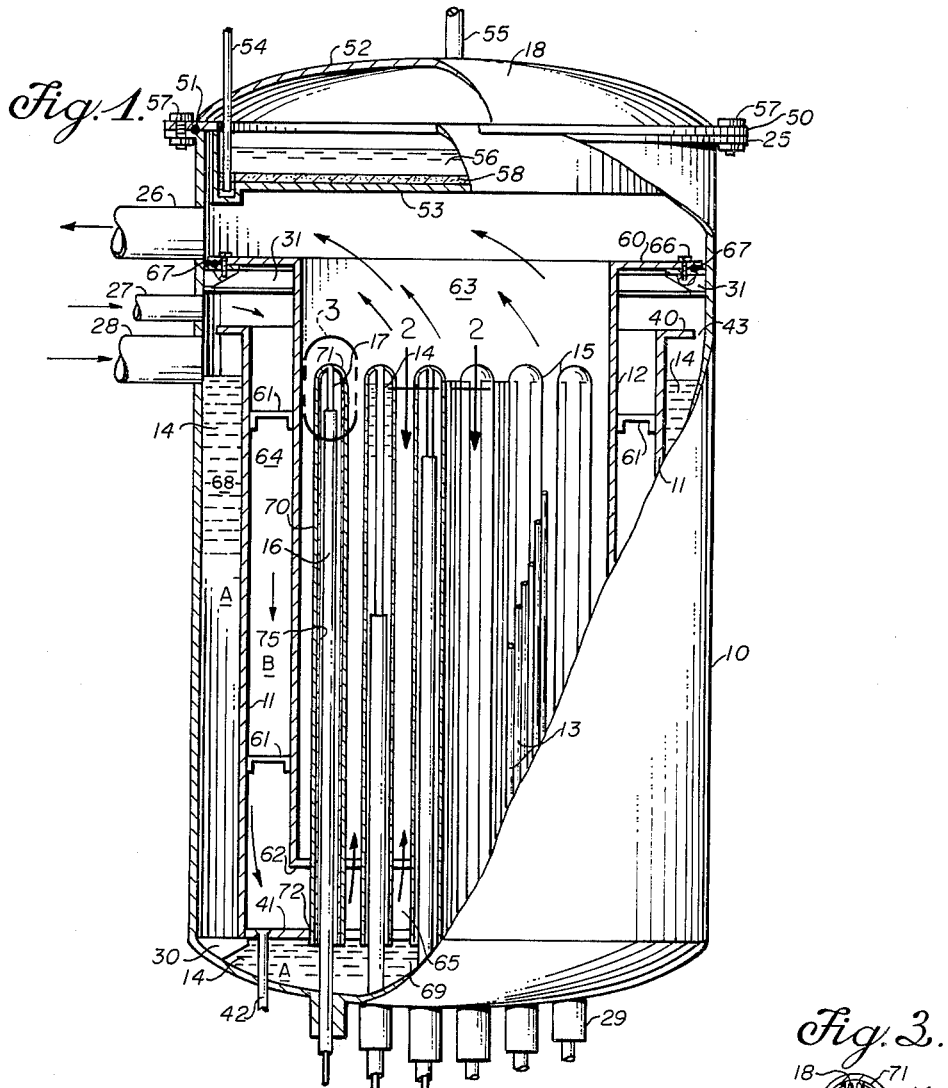
FIGURE 1 is a side elevation partial section showing a preferred embodiment of the reactor of the invention.

Referring to FIGURE 1, the basic configuration of the preferred embodiment comprises a main exterior reactor containment pressure vessel including a lower generally cylindrical tank portion 10 having a domed bottom and vessel head 18. Nested cup-shaped wall portions or receptacles disposed within said vessel provide a so-called three tank configuration as follows: A first inner cup shaped tank wall 11 disposed in spaced relation and generally concentric within outer tank 10 defines a first chamber A therewith, said first chamber including an annular portion disposed between the cylindrical and domed portions of said vessel 10 and tank wall 11, and a second inner tank wall 12 disposed in spaced relation and generally concentric with tank wall 11, defines a second chamber B therebetween. A moderator, e.g., water, is disposed in said first chamber. The core of the reactor is contained within second inner tank 12 and comprises a plurality of fuel rods 13 arranged in ordered geometric array interspersed with a plurality of inverted thimble-like moderator process tubes 15 communicating at the lower end with chamber A to receive moderating material 14. Centrally disposed within moderator process tubes 15 are annular control rods 16 concentric about moderator outlet tube 17 which terminate near the upper end of tubes 17. More particularly, reactor vessel head 18 functions to close off and seal the main access to the reactor core and is removable for refueling and repair. Said vessel head 18 is attached and sealed by means of a peripheral flange 50 to lower tank portion 10 and defines a third chamber within a dome-shaped top portion 52 and a depending tank shell 53 in which is disposed biological shield material 56.

In detail, flange 50 is secured to a flange 25 disposed proximate the covered end of outer tank 10. Disposed between flange 50 of reactor vessel head 18 and flange 25 of tank 10 is sealing means 51 such as gaskets, O-rings or the like. Fastening means 57 such as bolts (as shown) clamps, dogs or the like are provided to hold flanges 25 and 50 together in order that pressure integrity of the vessel is maintained.

The lower wall of tank shell 53 also provides the upper marginal wall of superheated steam plenum 63. A layer of thermal insulating material 58 is employed between biological shield material 56 and the superheated steam in plenum 63 in order to prevent both heat loss from the superheated steam and boiling of the biological shield material 56. The biological shielding material can be any one of a number of liquids including light water, heavy water, borate solution, cadmium solution or the like. To remove reactor vessel head 18, biological shielding material 56 is first pumped out of the tank formed by cover 52 and tank shell 53 through conduit 54 after opening vent 55. The thus lightened vessel head 18 can then be lifted off after removing fastening means, e.g., flange bolts 57, by a medium or light duty hoist. When replacing vessel head 18, biological shielding material 56 can again be pumped into the tank through conduit 54. While functioning as a biological shield, material 56 in absorbing neutrons and gamma radiation may increase in temperature. Conduits 54 and 55, in such case, function in concert with heat exchanging and a pumping means (not shown) exterior to the reactor, as means for cooling and circulating coolant biological shielding material through reactor vessel head 18.

A lower support means 30 is provided proximate the bottom interior of tank 10 to support tank wall 11 at its lower end. Said support means 30 may be a plurality of brackets or the like which permit free circulation of moderator material within said first chamber A. To support second inner tank 12, an upper support means 31, is provided peripherally about the inside of tank 10 near its upper end. Unlike lower support means 30, upper support means 31, supports second inner tank 12 at its upper end and, in addition, forms a continuous barrier coating with seal 67 to prevent superheated steam from plenum 63 from entering said second chamber B.

Superheat steam outlet conduit 26 penetrating and sealed, as by welding or the like, to outer tank 10 at a point immediately above upper support means 31 communicates with plenum 63. Although only one outlet conduit is shown in this embodiment, increased steam capacity can be achieved by employing a plurality of circumferentially disposed outlet conduits about tank 10 radiating from superheat steam plenum 63. Immediately below upper support means 31 is saturated steam inlet conduit 27 penetrating and sealed, as by welding or the like to tank 10 and communicating with second chamber B in the manner of outlet conduit 26. Similarly, although only one inlet conduit is shown in this embodiment, increased steam capacity can be achieved by employing a plurality of conduits 27 circumferentially disposed inlet about tank 10.

Saturated steam introduced through conduit 27 enters the upper end of second chamber B, i.e., plenum 64, and passes downwardly and enters plenum region 65 of Chamber B, passes upwardly through the core region to the superheater to enter plenum 63 and discharge through superheated steam outlet conduit 26. Plenum region 65 is generally disposed between bottom plate 41 of tank 11 and bottom plate 62 of tank 12. Accordingly, support of containment tubes 15, is provided by plate 41 which forms the bottom of tank 11 resting on previously described lower support means 30. A conduit 42 penetrating and sealed with respect to the tank walls 10 and 11 and communicating with lowermost regions of Chamber B and/or plenum 65, provides for the rapid draining of condensate, steam, moderator or the like gaseous or liquid material from the reactor. Combined fastening means and seal 72 about the bottom of moderator containment tube 15 is arranged to prevent fluid communication between plenum 65 and Chamber A, i.e., the space defined between tank walls 10 and 11 and the space defined between tank walls 11 and 12. Moderator containment tubes 15 are therefore arranged to be open at the bottom to permit both the flow of moderator material 14 through and the movement of control rod 16 up into said moderator containment tube 15.

Moderator inlet conduit 28 penetrates and is sealed to outer tank wall 10 immediately below inlet conduit 27, in order to deliver moderator material 14 into plenum 68 of said second Chamber B. Conduit 28, likewise, although shown as a single inlet conduit in this embodiment, may be changed to a plurality of inlet and outlet conduits circumferentially disposed at appropriate levels about outer tank 10 to achieve a greater and more uniform circulation of moderator liquid through Chamber A, process tubes 15 and out through moderator outlet tubes 17.

Reciprocating seal means 29 is provided proximate the bottom of outer tank 10 to permit the movement of control rods 16 in and out of the reactor core region without leakage of coolant.

Concentric within, and in spaced relationship to outer tank wall 10, first inner tank wall 11 is provided with outward radiating upper peripheral flange 40 about its upper open end. Flange 40 is arranged to have an opening 43 between it and the inside surface of outer tank wall 10. Such opening 43 permits the pressure in the space between tank walls 10 and 11 to be approximately equal to the pressure in the space between tank walls 11 and 12, thus permitting lighter weight construction of first inner tank wall 11.

Concentric within and in spaced relation to first inner tank wall 11, second inner tank wall 12 is provided with outward radiating upper peripheral flange 60 about its upper open end. Upper flange 60 is supported by, sealed and fastened to, previously described upper support means 31. Fastening means 66, in accordance with the present embodiment, incorporates bolts, machine screws or the like. Sealing means 67, as by a gasket, welding or the like, is provided to prevent communication between plenum 63 and inlet plenum 64, formed by the tank walls 11 and 12. Intermediate support means 61 are provided to maintain the spaced relationship between the bottom walls of tanks 11 and 12 defining Chamber B and plenum 64. Such support means 61 may additionally act as guides to the steam flow on its passage to the superheat core area. Plate 62 is provided with openings to permit the passage of steam up and around fuel rods 13.

Fuel rods 13 can be of any general configuration having turbulence or flow controlling means about their exterior and arranged in spaced relationship by means well known in the art. Preferably, fuel rods 13 should be unitized in bundles held in place by gravity and having coupling means to facilitate simplified refueling methods (not shown).

Figure 2:
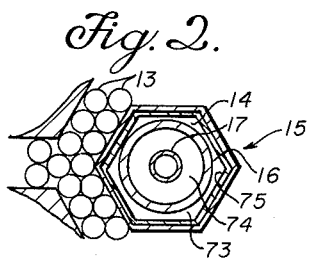
FIGURE 2 is a partial section through the reactor taken at line 2—2 of FIGURE 1.

Referring to FIGURE 2, moderator containment process tubes 15 are preferably in the shape of an elongated tubular shell 70 having a hexagonal cross section. Referring back to FIGURE 1, shell 70 is further provided with a cladding of insulating material 75 to reduce the heat loss from the steam to the moderating material within containment tube 15. Insulating material 75 may be any suitable material having relatively low neutron absorption cross section and that will withstand the temperatures encountered, i.e., stainless steel or zirconium sheets spaced apart forming a space for air, gas solid insulating material or the like. An upper cap portion 71 (FIG. 3) is sealed, as by welding or the like, to shell 70 to effectively contain moderator material 14.

Figure 3:
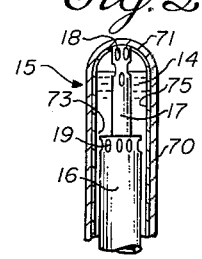
FIGURE 3 is a section through the upper end of a process tube showing the control rod and flow guide tube configuration.

As indicated above, flow guide tube 17, coincident with the longitudinal axis of process tube 15, is arranged, as in FIGURE 3, so that its upper end is proximate the underside of upper cap portion 71. In the preferred embodiment, the end of tube 17 is fastened as by welding or the like to the underside of upper cap portion 71. A plurality of openings 18 are provided proximate the upper end of tube 17 proximate a point just below the underside of upper cap portion 71 to permit the free circulation of moderator material 14 through process tubes 15 and flow guide tubes 17.

In the event that control rod 16 is inserted in process tubes 15 so that the top of control rod 16 rests against upper cap portion 71, a plurality of openings 19 are provided proximate the upper end of control rod 16 to maintain the free circulation of moderator material 14 through process tube 15 and flow guide tube 17.

Referring again to FIGURE 2, a cylindrical control rod 16 is arranged concentric about flow guide tube 17. Concentricity of said control rod 16 and flow guide tube 17 may be maintained by radial spacers (not shown), on the inside of control rod 17 slidably arranged against flow guide tube 17. Defined between the exterior of cylindrical control rod 16 and the interior surface of insulating material 75 on shell 70 is outer channel 73. Similarly defined between the exterior of flow guide 17 and the interior of cylindrical control rod 16 is intermediate channel 74. Said channel 74 and tube 17 are arranged to be connected to a flow control means (not shown) such as pumps, valves or the like, exterior to the reactor.

In operation, low quality steam enters the reactor through conduit 27 then passes through plenum 64 of chamber B, between tank walls 11 and 12 and into plenum 65. The steam then passes up through fuel rod support means 62, around fuel rods 13 where it is superheated to a quality dependent upon the temperature of the fuel rods and at the rate of heat transfer between the fuel rods and the steam, then into plenum 63 and finally out through conduit 26.

Control of this reactor is achieved both by inserting rods of neutron absorbing material into the core and by varying the amount of moderator material in the core thus changing the moderator-to-fuel ratio. By placing control rod 16 inside and coincident with the longitudinal axis of moderator containment tube 15, the effectiveness of the rod is enhanced due to the improved absorption of neutrons moderated and thermalized by liquid moderator material 14 in containment tube 15. As control rod 16 is inserted into the reactor, it displaces some of the moderating material reducing the moderator to fuel ratio from optimum values lower reactivity and having the effect of further increasing the control rod effectiveness and by trapping neutrons in the moderator material within the cylindrical rod. In addition, by replacing large diameter control rods with control rods of smaller diameter during the operating life of the reactor, the long-term decreased reactivity effects may be offset to provide a longer operating period and increased fuel burnup.

Flow guide tubes 17 are provided to vent any gases or vapors generated in the material, thus preventing moderator material 14 from being expelled from containment tube 15 under normal operation. In the event of a power surge in the reactor, moderator material 14 will begin to boil at a more rapid rate. Some of the vapors will pass out through flow guide tube 17, the remaining portion will tend to force the moderator material out of tube 15. With this decrease in amount of moderator, the neutron population will not be moderated as effectively to the higher fission cross section level, the tendency of the neutrons to leak out of the reactor is increased, thus providing an inherent safety mechanism to quell an excursion.

In normal steady state operation, moderator material 14 flows continuously, entering the reactor through conduit 28, passing into plenum 68 between the tank walls 10 and 11, and passing up through moderator containment tubes 15 and out of the reactor through flow guide tubes 17 and intermediate channel 74. Without departing from effective operation of this invention, the flow of moderator material 14 could be reversed so that the moderator enters the reactor through flow guide tubes 17 and intermediate channel 74 and exits through conduit 28. By using suitable valves (not shown) on each flow guide tube 17 exterior to the reactor, the moderator flow, and thus moderator-to-fuel ratio, can be varied at different points within the reactor. For large reactors, such control is desirable to achieve power flattening throughout the core for economical utilization of the fuel.

Refueling of the core is achieved by first draining the reactor vessel head 18 of biological shield material 56, removing fastening means 57 and lifting off the reactor vessel head 18. The unitized fuel bundles of fuel rods 13 can then be lifted out and replaced. To further reduce the hazards of dangerous reactivity surges should a fuel rod bundle be dropped into the core, the volume normally occupied by moderator material 14 can be flooded with neutron absorbing material such as solutions containing large amounts of boron or cadium ions.

As an example of a typical embodiment of this invention, the following is a tabulation of dimensions and parameters for a typical superheat reactor:

*Table*

A. Thermal power:
   (1) Thermal power (to steam) _ 198.8 mwt.
   (2) Thermal power (to moderator) _____ 15.0 mwt.
   (3) Total thermal power _____ 213.8 mwt.

B. Steam conditions:
   (1) Exit steam condition _____ 980 p.s.i.a., 900° F.
   (2) Inlet steam condition _____ 1,055 p.s.i.a.
   (3) BWR steam flow _____ 2,564,000 lbs./hr.

C. Reactor description:
   (1) Reactor vessel:
     (a) Inside diameter _____ 11.5 ft.
     (b) Inside height _____ 43.00 ft.
     (c) Wall thickness _____ 4 in. base, ¼ in. S.S. clad.

(2) Reactor core:
     (a) Active equivalent diameter _____ 9 ft.
     (b) Active height _____ 2.0.
     (c) Fuel-to-water ratio ___ 3.1 in.
     (d) Process tube diameter _
     (e) Number of process tubes _____ 600.
     (f) Superheat fuel rod diameter _____ 0.5 in.
     (g) Number of superheat fuel elements _____ 5700.
     (h) Average core heat flux _ 100,000 B.t.u./hr.-ft.$^2$ The superheat reactor according to this invention is operated in series with a boiling water reactor to increase the temperature of saturated steam produced in the boiling water reactor to a superheat temperature range prior to introduction of the steam to a steam turbine connected to drive an electric generator. The above table specifies the significant dimensions and parameters for a superheat reactor operating with a boiling water reactor to produce 300 mwe. The boiling water reactor has a thermal rating of 619 mwt. and produces 2,564,000 lbs./hr. of 553° F., 1075 p.s.i.a. steam.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. In a nuclear superheat reactor, the combination comprising, means defining an outer pressure vessel having a removable cover, a first inner tank concentric and in spaced relationship to said outer pressure vessel, a second inner tank concentric and in spaced relationship to said first inner tank, a plurality of process tubes for liquid moderator material disposed in ordered array and in spaced relationship to each other within said pressure vessel, a plurality of control rods, each of said rods individually disposed in each of said process tubes, a plurality of fissile fuel elements disposed in ordered array and in spaced relationship to each other between said process tubes, means for circulating liquid moderator material on the outside of said first inner tank and through said process tubes, conduit means for directing steam around the outside of and through said second inner tank to contact said fuel elements and be superheated thereby, and means for exhausting said superheated steam from said second inner tank.

2. The combination according to claim 1 wherein said removable cover comprises means defining a tank having a domed top portion, a concave bottom portion and an outer peripheral flange, an inlet proximate the top portion and conduit means defining an outlet for liquid biological shielding material inside said tank proximate the bottom of said concave bottom portion.

3. The combination according to claim 2 wherein said concave bottom portion comprises an insulated bottom plate, a drain sump in said bottom plate, and cylindrical sides disposed about and attached to its lower end to said insulated bottom plate and attached at its upper end to said outer peripheral flange.

4. In a nuclear superheat reactor, the combination comprising, means defining an outer pressure vessel having a removable top, a first inner tank concentric and in spaced relationship to said outer tank and defining a first chamber in proximity to said outer pressure vessel and to said first inner tank, a second inner tank concentric and in spaced relationship to said first inner tank and defining a plenum in proximity to said first inner tank and to said second inner tank and communicating with the interior of said second inner tank, a plurality of process tubes for liquid moderator material disposed in spaced relationship to each other and in ordered array within said second inner tank and communicating with said first chamber, a plurality of fissile fuel elements disposed in spaced relationship to each other and in ordered array in said spaces between said process tube, a plurality of control rods individually disposed in said process tubes, means for circulating liquid moderator material into said first chamber and into said process tubes, conduit means for directing steam into said plenum between said first inner tank and said second inner tank through said second inner tank to contact said fuel elements to be superheated thereby, and means for exhausting said superheated steam from said second inner tank.

5. In a nuclear superheat reactor, the combination comprising means defining an outer tank, means defining a cover for said outer tank, means defining a first inner tank, open at one end, concentric with and in spaced relationship to said outer tank, means defining a second inner tank, open at both ends, concentric and in spaced relationship to said first inner tank, a plurality of means defining containers for liquid moderator material disposed in spaced relationship to each other and in ordered array within said second inner tank and in fluid communication with said space between said outer tank and said first inner tank, means defining containers of fissile material disposed in spaced and ordered array in said spaces between said containers for liquid moderator material, means defining a control rod within said container for liquid moderator material, means defining a conduit within said container for liquid moderator material for maintaining fluid communication with the exterior of said outer tank, means defining a conduit for moderator material for maintaining fluid communication between said space between said outer tank and said first inner tank with the exterior of said outer tank, means defining a conduit for directing steam into said space between said first inner tank and said second inner tank, means defining a conduit for exhausting the steam from said second inner tank after being superheated by said fuel rods contained therein.

6. The combination according to claim 5 wherein said control rod is further defined by a plurality of openings proximate the upper end of said control rod through which liquid moderator material flows when said control rod is in its uppermost position.

7. The combination according to claim 6 wherein said means defining a conduit within said container for liquid moderator material further comprises a plurality of openings proximate the upper end thereof and fastening means attaching the upper end of said conduit to the top of said container.

8. The combination according to claim 6 wherein said containers for liquid moderator material further comprises a layer of thermal insulating material along the inner surface thereof.

References Cited by the Examiner

UNITED STATES PATENTS

| 3,085,959 | 4/63 | Germer | 176—59 |
| 3,085,964 | 4/63 | Ritz et al. | 176—60 |
| 3,183,168 | 5/65 | Bell | 176—59 |
| 3,188,277 | 6/65 | Kornbichler et al. | 176—59 |

References Cited by the Applicant

UNITED STATES PATENTS

| 2,938,845 | 5/60 | Treshow. |
| 3,034,977 | 5/62 | Holl et al. |

CARL D. QUARFORTH, *Primary Examiner.*